United States Patent
Bentley et al.

(10) Patent No.: US 6,761,398 B2
(45) Date of Patent: Jul. 13, 2004

(54) STOWABLE TABLES

(75) Inventors: Paul Bentley, Gainesville, TX (US); Adrianus W. N. Ruiter, Denton, TX (US); Matthew G. Durocher, Denton, TX (US)

(73) Assignee: Weber Aircraft LP, Gainesville, TX (US)

( * ) Notice: Subject to any disclaimer, the term of this patent is extended or adjusted under 35 U.S.C. 154(b) by 0 days.

(21) Appl. No.: 10/061,047

(22) Filed: Jan. 29, 2002

(65) Prior Publication Data

US 2003/0137174 A1 Jul. 24, 2003

Related U.S. Application Data

(63) Continuation-in-part of application No. 09/865,841, filed on May 25, 2001.

(51) Int. Cl.⁷ .............................................. A47B 39/00
(52) U.S. Cl. ..................... 297/146; 297/135; 297/163; 297/165; 297/173
(58) Field of Search ................................ 297/146, 135, 297/163, 164, 165, 166, 167, 168, 169, 173

(56) References Cited

U.S. PATENT DOCUMENTS

| | | | |
|---|---|---|---|
| 423,698 A | | 3/1890 | Plimsoll |
| 462,723 A | * | 11/1891 | Morss |
| 1,073,718 A | * | 9/1913 | Stubblefield |
| 1,178,749 A | | 4/1916 | Petrow |
| 2,098,426 A | * | 11/1937 | McDonald |
| 2,284,811 A | * | 6/1942 | Ferrelle |
| 2,479,175 A | | 8/1949 | McArthur |
| 2,619,395 A | * | 11/1952 | Kent |
| 2,963,078 A | * | 12/1960 | Ferrelle |
| 3,773,381 A | | 11/1973 | Brennan |
| 4,159,071 A | * | 6/1979 | Roca |
| 4,334,709 A | | 6/1982 | Akiyama et al. |
| 4,511,178 A | * | 4/1985 | Brennan |
| 4,519,648 A | | 5/1985 | Jovanovic |
| 4,726,621 A | * | 2/1988 | Muller |
| 4,773,703 A | | 9/1988 | Krugener et al. |
| 4,915,447 A | | 4/1990 | Shovar |
| 4,944,552 A | | 7/1990 | Harris |
| 5,058,954 A | | 10/1991 | Kan-Chee |
| 5,092,652 A | * | 3/1992 | Macaluso |
| 5,133,587 A | | 7/1992 | Hadden, Jr. |
| 5,283,735 A | | 2/1994 | Gross et al. |
| 5,370,444 A | | 12/1994 | Stulik |
| 5,483,853 A | | 1/1996 | Moradell et al. |
| 5,553,923 A | | 9/1996 | Bilezikjian |
| 5,560,681 A | | 10/1996 | Dixon et al. |
| 5,636,898 A | | 6/1997 | Dixon et al. |
| 5,647,635 A | | 7/1997 | Aumond et al. |
| 5,651,587 A | | 7/1997 | Kodaverdian |
| 5,712,625 A | | 1/1998 | Murphy |
| 5,882,070 A | | 3/1999 | Genn |
| 5,887,949 A | | 3/1999 | Kodaverdian |
| 5,931,527 A | * | 8/1999 | D'Onofrio et al. |
| 6,237,994 B1 | | 5/2001 | Bentley et al. |

FOREIGN PATENT DOCUMENTS

| | | | |
|---|---|---|---|
| DE | 9304753 | | 10/1993 |
| DE | 19631455 | | 2/1998 |
| DE | 19848889 | | 4/1999 |
| EP | 1044877 | | 10/2000 |
| WO | WO 91/09778 | * | 7/1991 |

OTHER PUBLICATIONS

"Pain Be Gone," Conde Nast Traveler, May 2001, pp. 139–140 and 147–148.

* cited by examiner

*Primary Examiner*—Laurie K. Cranmer
(74) *Attorney, Agent, or Firm*—Dean W. Russell; Kilpatrick Stockton LLP (57) ABSTRACT

Structures and assemblies for stowable tables and similar objects are detailed. Versions of the assemblies may cooperate with pivoting covers mounted to vehicle seats for purposes of deploying and retaining the tables. Other versions may include tables biased to fit snugly in recessed portions of backrests of seats, with compression of the biasing mechanism occurring sometimes when backrests are reclined and expansion of the mechanism occurring sometimes when the tables are deployed. Yet other versions may include tables latching to bars or other objects protruding rearward from the backrests.

15 Claims, 7 Drawing Sheets

STOWABLE TABLES

CROSS-REFERENCE TO RELATED APPLICATION

This application is a continuation-in-part of and claims priority to co-pending U.S. patent application Ser. No. 09/865,841, filed May 25, 2001, entitled "Adjustable Seats" (the "Bentley Application"), the contents of which are incorporated herein in their entirety by this reference.

FIELD OF THE INVENTION

This invention relates to stowable tables and associated storage assemblies and more particularly (although not exclusively) to tray tables used for food service and other functions aboard vehicles such as (although again not exclusively) passenger aircraft and trains.

BACKGROUND OF THE INVENTION

Commonly-owned U.S. Pat. No. 4,944,552 to Harris discloses stowable table systems for commercial vehicles including aircraft. Designed for stowage in a compartment within an armrest of a seat, the table of the Harris patent is adapted "to be angularly displaced to a degree sufficient to permit the user to leave the seat obstructed by the table" when the table is "in its horizontally disposed position of use." See Harris, col. 1, ll. 10–13. Because storage of the table occurs within the armrest of a seat, no latching mechanism is necessary to retain the table in its stowed position.

Recently-issued U.S. Pat. No. 6,237,994 to Bentley, et al., also commonly-owned with this application, describes multi-function seats for aircraft and other vehicles. Discussed in the Bentley, et al. patent are table assemblies again often (although not necessarily) stowed in compartments within armrests of seats. Among features of these assemblies are that the upper surfaces of the tables may function as non-horizontal rests for, e.g., books, magazines, or computers and the tables themselves may be adjustable vertically for passenger comfort.

Illustrated in the Bentley Application are tables that may be latched, or otherwise connected, to rear portions of backrests of seats. As described in the Bentley Application, pins present in a table may engage slot-containing members connected directly or indirectly to a backrest to retain the table in an undeployed condition (as is frequently required at least during taxi, take-off, and landing of commercial aircraft). In some embodiments of the invention, by rotating a knob or similar structure, a passenger may retract the pins from the slots to deploy the table for use.

Unlike most existing commercial vehicle chairs, seats detailed in the Bentley Application are adapted for both rotational and linear movement. Accordingly, the slots mentioned in the preceding paragraph may be elongated with respect to the pins, thus permitting the backrest to move substantially before mandating any corresponding movement of the (undeployed) table. Such substantial movement may occur, for example, when the backrest reclines upon passenger demand.

SUMMARY OF THE INVENTION

The present invention provides alternative structures and assemblies for stowable tables and similar objects. Typically connected directly or indirectly to backrests of seats, tables of the invention may be latched, or otherwise retained in stowed positions, in numerous ways. In some embodiments, tables may cooperate with pivoting covers for retention and deployment purposes. In other embodiments, tables may be biased to fit snugly in a recessed portion of a backrest when stowed, with the biasing mechanism also permitting extension of the table toward a passenger when the table is deployed. In yet other embodiments, both of these features may be utilized (or combined with any of the structure of the Bentley Application) if appropriate or desired. Similarly, any of these embodiments may include conventional or other latching mechanisms for added retention assurance. Further embodiments, alternatively or additionally, may permit tables to latch to bars or other objects protruding rearward from backrests of seats.

Versions of the innovative assemblies incorporating covers typically include a cover attached to a portion of the rear or sides of a backrest. The cover defines a space between its surface and the rear of the backrest into which a portion of a tray table may be stowed. Assuming the cover is sufficiently rigid as not to deform when contacted by the table, its presence can help prevent undesired deployment of the table. Likewise, if used with the seats and tables of the Bentley Application, the cover effectively can shield passengers from any gap that might be present between an undeployed table and the rear of the backrest of a reclinable seat. Preferably the cover is mounted to the backrest so as to be able to pivot about the mounting to facilitate deployment and stowage of the associated table.

Biasable versions of the assemblies may include one or more springs cooperating with the mechanism used to extend and retract the table respectively toward and away from a passenger. In their uncompressed state, the springs may extend the table toward the passenger when deployed. To return a table to its stowed position within a recess in the seatback, the passenger need merely push the table so as to compress the spring and fit the table within the recess. Because once the table is so fitted the spring will attempt to return to its uncompressed state, it can cause the distal end of the table to fit snugly against the corresponding end of the recess, thereby assisting retention of the table.

It thus is an object of the present invention to provide structures and assemblies for stowable tables and similar objects.

It is also an object of the present invention to provide mechanisms for retaining tables in stowed positions.

It is another object of the present invention to provide assemblies in which a stowable table cooperates with a cover connected directly or indirectly to the backrest of a seat.

It is a further object of the present invention to provide assemblies in which the cover is adapted to pivot to facilitate deployment and stowage of an associated table.

It is an additional object of the present invention to provide assemblies in which a table is biased to fit snugly in a recessed portion of a backrest when stowed.

It is too an object of the present invention to provide assemblies in which tables latch to bars or other objects or members protruding rearward of backrests of seats.

It is yet another object of the present invention to provide assemblies in which a table-biasing mechanism may be used to extend a deployed table toward an associated passenger.

Other objects, features, and advantages of the present invention will be apparent to those skilled in the art with reference to the remainder of the text and drawings of this application.

DETAILED DESCRIPTION

Figure 1:
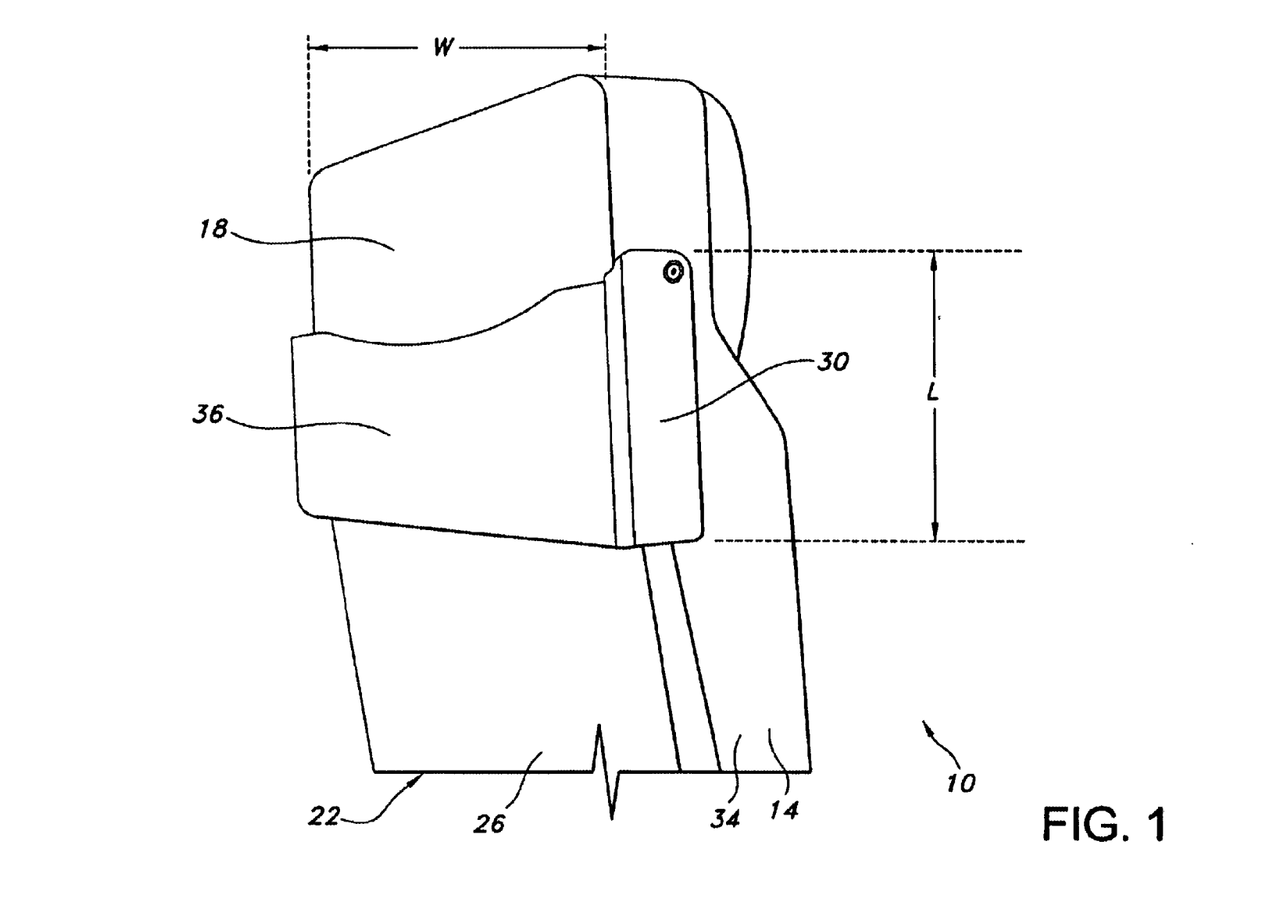
FIG. 1 is a perspective view of a portion of a seat illustrating an exemplary table and cover of the present invention.
Figure 2:
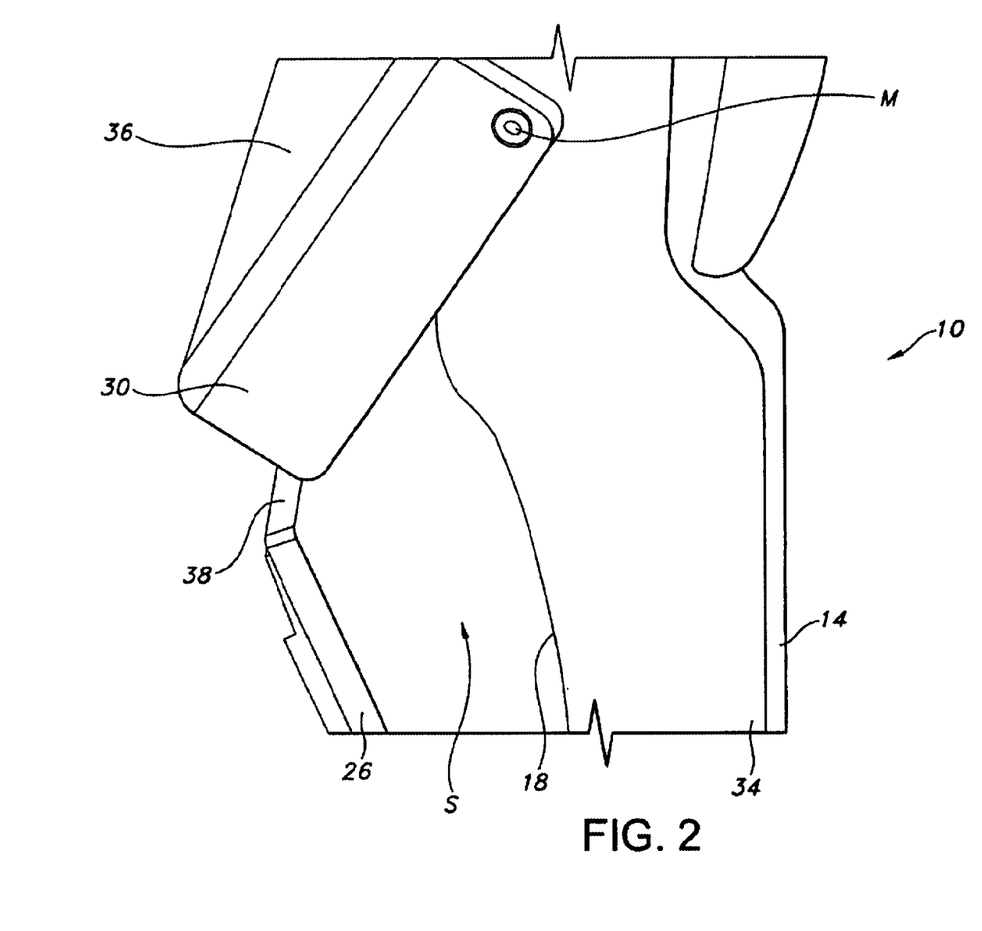
FIG. 2 is a perspective view of a portion of the seat of FIG. 1 showing the pivotable nature of the cover.

Detailed in FIGS. 1–2 is a portion of a seat 10 typically (but not necessarily) intended for use in a vehicle such as a commercial aircraft. Seat 10 comprises generally a frame and seat bottom (not depicted in FIGS. 1–2) as well as backrest 14. The seat 10 is adapted to receive a sitting passenger when in use, with backrest 14 typically being moveable upon demand of the passenger between an upright-most position and any of a variety of reclined positions. If seat 10 is of a type consistent with seats of the Bentley Application, both backrest 14 and the seat bottom may translate, hence having both linear and rotational movement.

Extending from the rear 18 of backrest 14 may be table assembly 22, designed for use by a passenger in a seat positioned immediately behind seat 10. Assembly 22 comprises at least tray table 26 and means for connecting table 26 to seat 10. An exemplary such means may be the attached arms shown in the Bentley Application, although those skilled in the relevant fields will understand that other means may be utilized instead.

FIG. 1 illustrates table 26 in its stowed position. As so positioned, table 26 usually abuts rear 18 so as not to extend appreciably therefrom. Depending upon its connection to seat 10, table 26 may either move identically with backrest 14 (in which event there would be no relative movement between the two) or differently therefrom (in which case relative movement between the two would occur). The latter circumstance admits the possibility of table 26 no longer abutting rear 18 even when stowed, the result being formation of a gap between stowed table 26 and the rear 18 of backrest 14.

Although useful even when no gap exists, cover 30 is especially advantageous in counteracting certain potential issues associated with the presence of a gap between stowed table 26 and rear 18. As depicted in FIGS. 1–2, cover 30 may be mounted to sides 34 of backrest 14 and span some or all of width W of rear 18, defining a space S between its major surface 36 and rear 18. Length L of cover 30 is such that major surface 36 overlaps at least a portion of table 26 when the table 26 is stowed (as in FIG. 1), thus covering the mouth of any gap that might exist between stowed table 26 and rear 18. To deploy table 26, a passenger need merely pivot cover 30 upward about its mounting point M—as shown in FIG. 2—to expose end 38 of table 26. Depending on how table 26 is connected to seat 10, pivoting cover 30 upward may also expose a latching mechanism actuatable by the passenger. Alternatively, if cover 30 itself either latches in place or is sufficiently rigid, it alone may be used to retain table 26 in its stowed position.

Notwithstanding its depiction as being pivotally-connected to backrest 14, cover 30 need not necessarily be adapted to pivot. Instead, cover 30 could be extendable and retractable or otherwise configured so as to interact with or engage table 26 when appropriate for stowage yet permit deployment of the table 26. Likewise, such interaction or engagement need not necessarily be with end 38, but rather could be with any portion of table 26.

Figure 3:
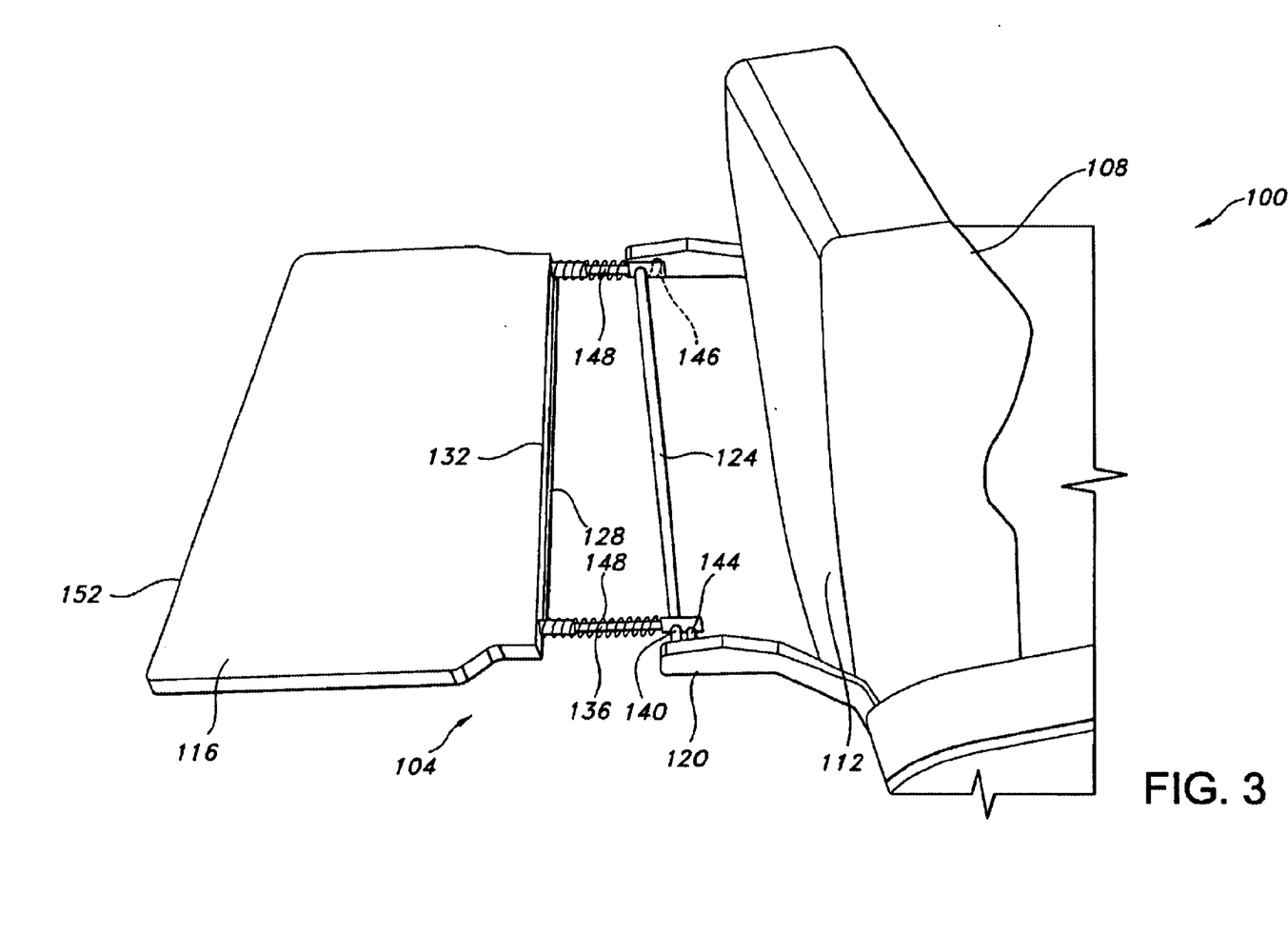
FIG. 3 is a perspective view of a portion of a seat illustrating another exemplary table of the present invention shown as deployed for use.
Figure 4:
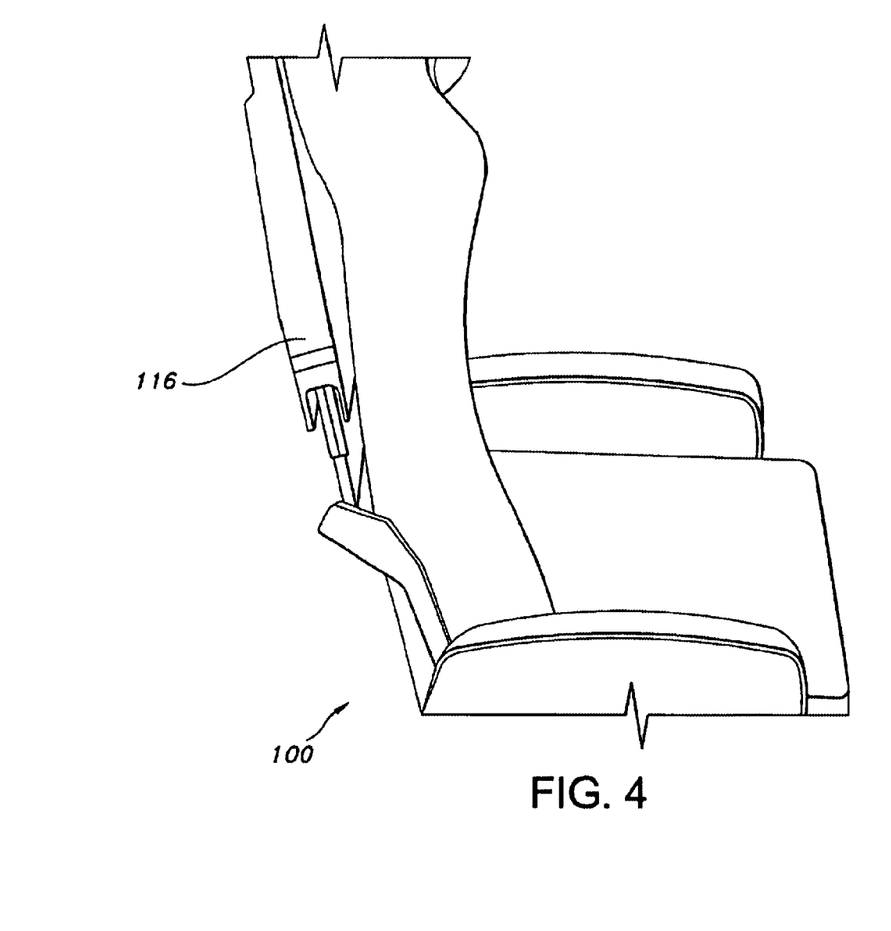
FIG. 4 is a perspective view of the table of FIG. 3 shown in process of being deployed or stowed.
Figure 5:
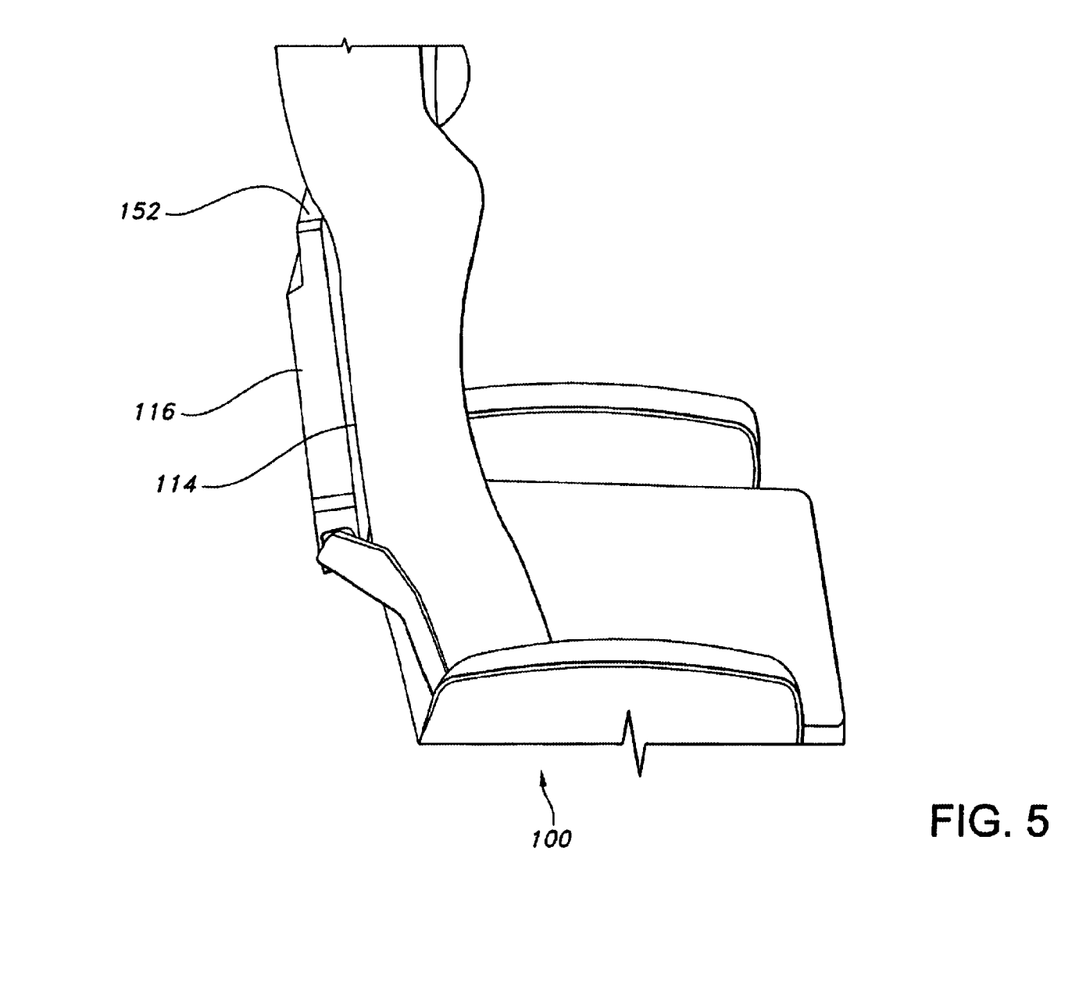
FIG. 5 is a perspective view of the table of FIG. 3 shown as stowed.

FIGS. 3–5 depict seat 100 to which table assembly 104 may be connected. Like seat 10, seat 100 may comprise at least a frame and seat bottom together with backrest 108. Present in rear 112 of backrest 108 is a recessed area 114 into which tray table 116 may be fitted when stowed. In addition to table 116, assembly 104 may include at least one or more moveable arms 120, by which table 116 may be connected to seat 100 in conventional manner. Although other means of connecting table 116 to seat 100 may be utilized, using two arms 120 is preferred for certain embodiments of the invention.

Versions of assembly 104 additionally may comprise rod 124 spanning the distance between arms 120. Rod 124 defines an axis about which table 116 may pivot from its substantially horizontal position in use (see FIG. 3) to its more vertical position when stowed (see FIG. 5) and vice-versa. When table 116 is stowed, rod 124 preferably is received by an elongated recess 128 in end 132 of the table 116, although it need not necessarily be so received. Likewise, when table 116 is deployed but in its retracted position, rod 124 preferably is received within recess 128.

FIG. 3, however, illustrates table 116 in a deployed position extended toward the passenger intended to use it. In this position rod 124, rather than being received by recess 128, is remote from the recess 128. FIG. 3 shows one manner of achieving this extension, using one or more minor arms 136 to connect table 116 to rod 124. Such arms 136 are able to travel in bores, slots, or other appropriate devices at least partially within table 116 to permit extension of table 116 (and retraction of the table 116) to occur. Each arm 136 typically includes an opening 140 though which rod 124 passes (so as to enable pivoting of table 116 about rod 124) and a pin 144 engaging an arcuate slot 146 within an arm 120 (so as to limit the angle through which such pivoting can occur).

Also depicted in FIG. 3 positioned between table 116 and rod 124 and about at least one arm 136 is coil spring 148. Spring 148 is an exemplary means for biasing a deployed table 116 toward the extended position of FIG. 3. Those skilled in the art will, of course, recognize that other biasing mechanisms may be used instead. Additionally, spring 148 need not necessarily be positioned about the exterior of an arm 136, but rather may be embedded within a sleeve or within arm 136 so as not to be readily accessible or visible to passengers. Furthermore, although only one spring 148 is detailed in FIG. 3, more than one such spring 148 may be utilized when appropriate or desired. Indeed, preferred embodiments of assembly 104 use two springs 148, one associated with each arm 136.

The bias provided by the one or more springs 148 also facilitates retention of table 116 when stowed in recessed area 114. FIG. 4 illustrates table 116 in the process of being stowed, having been pivoted about rod 124 into a substantially vertical position. Apparent from FIG. 4 is that table 116 does not automatically fit within recessed area 114; unlike as in certain existing table assemblies, merely pivoting table 116 about rod 124 does not necessarily permit table 116 to fit within area 114. Instead, as shown in FIG. 5, a passenger may depress end 152 of table 116 so as to compress springs 148, thereby allowing table 116 to fit within recess 114. Depending on the strength of springs 148, gravitational force may also cause some or complete compression of springs 148 as table 116 is rotated up from its horizontal position.

Once table 116 is fitted within recess 114, some expansion of springs 148 likely will enhance retention of the table 116 within the recess 114. If desired, more positive latching mechanisms (including, but not limited to, the knob and pin structure described in the Bentley Application) may also be employed, however, to ensure stowed tables 116 are retained within areas 114. If table 116 does not move identically with backrest 108, springs 148 also may compress some as backrest 108 is reclined, and in some circumstances portions of arms 136 may extend further out from their associated slots or bores as the backrest is returned more upright.

Figure 6:
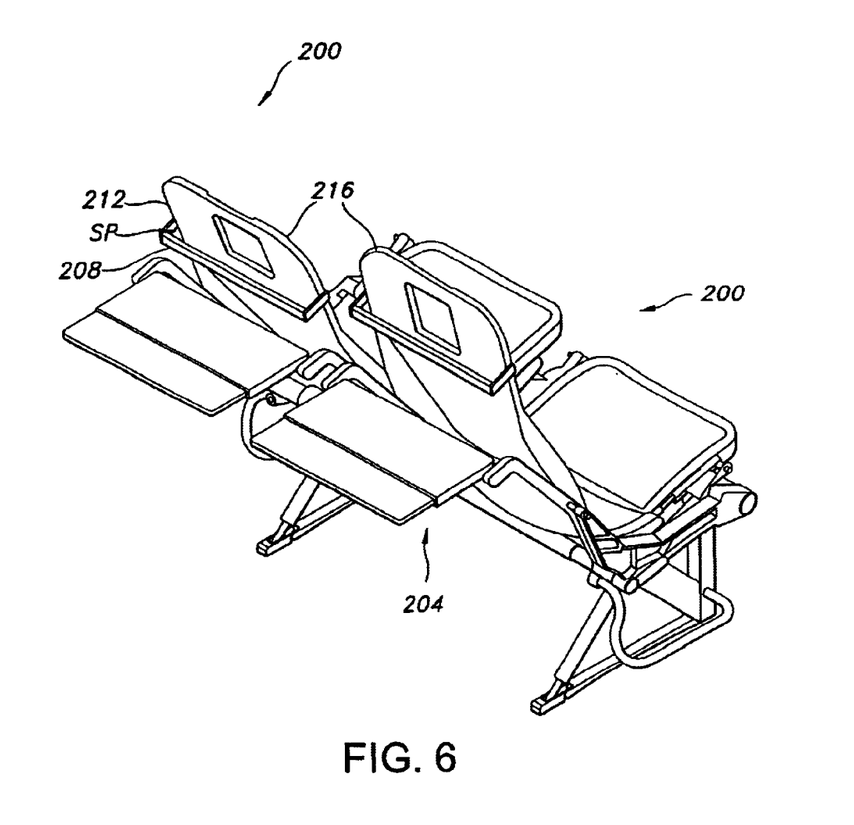
FIG. 6 is a perspective view of other exemplary tables of the present invention shown as deployed for use.
Figure 7:
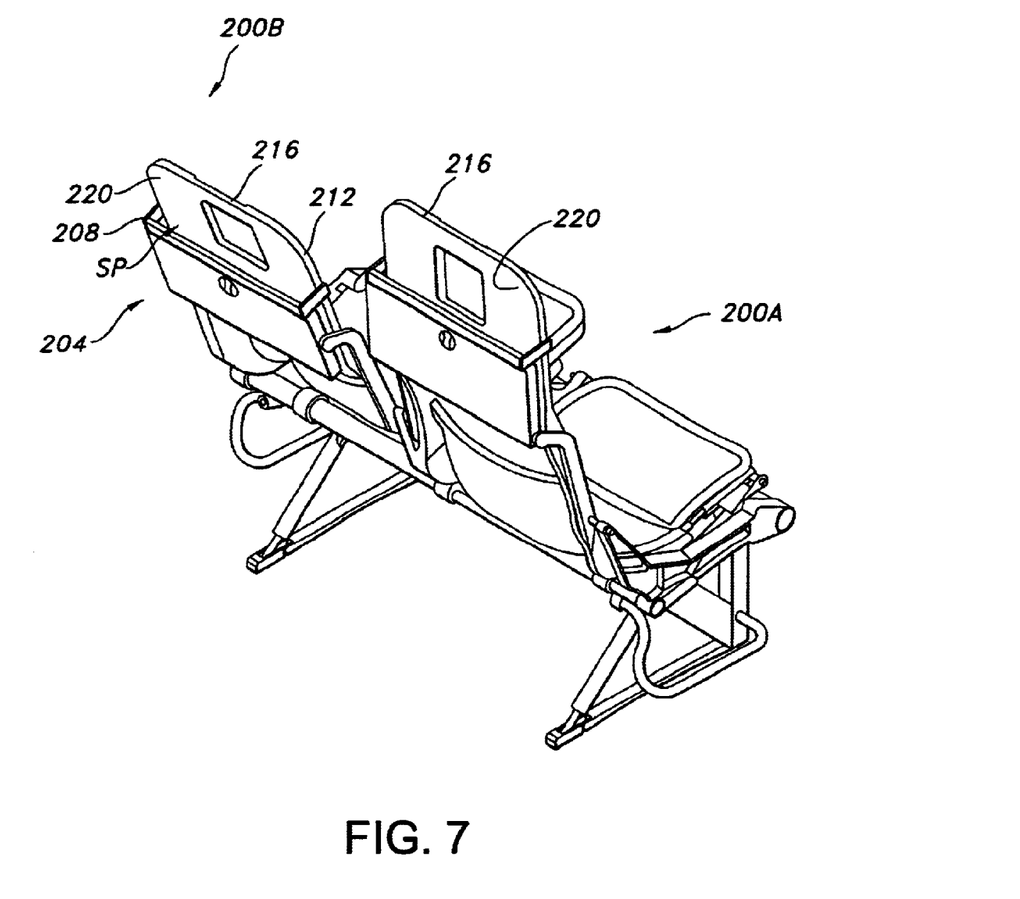
FIG. 7 is a perspective view of the tables of FIG. 6 shown as stowed.

FIGS. 6–7 illustrate seats 200 to which table assemblies 204 may be connected. Seats 200 generally may be similar to seats 10 and 100, and assemblies 204 generally may be similar to assemblies 104 or to other such table assemblies. However, as depicted in FIGS. 6–7, seats 200 may also include bar 208 to which assemblies 204 may latch for storage. Shown in the general form of a bracket connected to sides 212 of backrest 216, bar 208 typically protrudes rearward from rear 220 of the backrest 216. Bar 208 preferably is rigid and fixed in its connection to backrest 216, so as not to change position relative to backrest 216 regardless of whether seat 200 is upright (see, e.g., seat 200A) or reclined (see, e.g., seat 200B). Bar 208 need not necessarily be so configured, however, and objects or members other than bars and brackets may be employed instead.

As shown principally in FIG. 7, part of assemblies 204 may be stowed within the gap or space SP between each bar 208 and its corresponding rear 220 of backrest 216. Any suitable latching or other mechanism may be used to connect assemblies 204 to bars 208. Alternatively, bars 208 could be configured so that assemblies are fitted therein and retained in that manner.

The foregoing is provided for purposes of illustrating, explaining, and describing embodiments of the present invention. Further modifications and adaptations to these embodiments will be apparent to those skilled in the art and may be made without departing from the scope or spirit of the invention. For example, bars 208 may be omitted in some versions otherwise generally consistent with FIGS. 6–7, with table assemblies 204 reconfigured to latch or connect to backrests 216 instead. This is particularly (but not exclusively) possible when the internal sliding mechanisms within table assemblies 204 are connected to the (fixed) frames of seats 200, hence allowing the tables themselves to move together with the back rests 216 as the backrests are reclined or made more upright. Reclining backrests 216 additionally may compress any springs within the trays, although preferably the force provided by any such springs is low (but sufficient to balance the trays in these circumstances). The springs, if present, further may be installed so that they will not push the deployed tables toward passengers, but rather will either be neutral in such situations or reverse the direction of force in conjunction with an over-counter or other device. Numerous other modifications and adaptations are possible as well.

What is claimed is:

1. A seat assembly comprising:
   a. a backrest;
   b. a member protruding rearward from the backrest so as to define a space therebetween; and
   c. a table adapted to be stowed when not in use and to be deployed for use, the table being connected to the member when stowed and disconnected from the member when deployed.

2. A seat assembly according to claim 1 in which the member is a bar connected to the backrest.

3. A seat assembly according to claim 2 in which (i) the backrest is repositionable and (ii) the bar is connected to the backrest so that its position relative to the backrest remains fixed regardless of the position of the backrest.

4. A seat assembly comprising:
   a. a backrest;
   b. a table adapted (i) generally to abut the backrest when stowed and (ii) to extend therefrom when deployed; and
   c. means, comprising (i) a spring and (ii) an arm communicating with the table and about which the spring is positioned, for biasing the table away from the backrest when the table is deployed.

5. A seat assembly according to claim 4 in which the table defines a slot or bore in which the arm travels.

6. A seat assembly according to claim 5 in which the arm has an opening receiving a rod, the rod defining an axis about which the table pivots.

7. A seat assembly according to claim 6 in which the spring has two ends, one end abutting the table and the other end abutting the rod.

8. A seat assembly comprising;
   a. a frame;
   b. a backrest connected directly or indirectly to the frame;
   c. a stowable table adapted generally to abut the backrest when stowed and to extend therefrom when deployed;
   d. a pair of arms connected directly or indirectly to the frame;
   e. a rod connecting the pair of arms;
   f. first and second minor arms connecting the table to at least the rod; and
   g. at least one spring positioned about the first minor arm between the table and rod.

9. A seat assembly according to claim 8 further comprising at least one additional spring positioned about the second minor arm between the table and rod.

10. A seat assembly according to claim 9 in which the stowable table defines first and second bores or slots, with the first minor arm travelling in the first bore or slot and the second minor arm travelling in the second bore or slot.

11. A seat assembly according to claim 10 further comprising a cover connected directly or indirectly to the backrest and overlapping at least a portion of the table when the table is stowed.

12. A seat assembly comprising:
   a. a backrest;
   b. a stowable table adapted generally to abut the backrest when stowed and to extend therefrom when deployed, the table defining sides and first and second ends, the first end positioned above the second end when the table is stowed; and
   c. a cover connected at least indirectly to the backrest so as to overlap at least part of the first end of the table when the table is stowed.

13. A seat assembly according to claim 12 in which the cover is mounted to the backrest at a mounting point and pivots about the mounting point.

14. A seat assembly comprising:
   a. a backrest having a width;
   b. a stowable table adapted generally to abut the backrest when stowed and to extend therefrom when deployed; and
   c. a cover spanning the width of and connected at least indirectly to the backrest so as to overlap at least part of the table when the table is stowed.

15. A seat assembly according to claim 14 in which the cover is mounted to the backrest at two mounting points, the two mounting points defining an axis about which the cover pivots.

* * * * *